July 11, 1967 H. SIKORA 3,330,564
SEAL FOR ANTI-FRICTION BEARINGS
Filed July 20, 1964 2 Sheets-Sheet 1

United States Patent Office 3,330,564
Patented July 11, 1967

3,330,564
SEAL FOR ANTI-FRICTION BEARINGS
Hans Sikora, Dusseldorf-Heerdt, Germany, assignor to Hans Ziller, Hochdahl, Germany
Filed July 20, 1964, Ser. No. 383,671
Claims priority, application Germany, July 23, 1963, Z 10,249
12 Claims. (Cl. 277—39)

The present invention relates to an anti-friction bearing seal with one or more sealing discs and a sliding ring of rubber, or the like. For purposes of obtaining a good seal, it is known to cover the elastic oil-resistant seal of rubber, or the like toward the outside by an angled protective disc sliding with its end face edge. In such an instance, the said edge of the protective disc rests against the end faces of the inner or outer ring of the anti-friction bearing. Such an arrangement, however, has the drawback that the installation of such a seal is cumbersome because the seal has to be inserted between the anti-friction bearing and other structural members.

It is, therefore, an object of the present invention to provide an anti-friction bearing seal which will overcome the above-mentioned drawback.

It is another object of this invention to provide an anti-friction bearing seal which will greatly facilitate its installation.

Still another object of this invention consists in the provision of an anti-friction bearing seal as set forth in the preceding paragraphs, which will simultaneously improve the sealing effect.

It is also an object of this invention to provide an anti-friction bearing seal as set forth above, which will greatly aid in preventing soil and impurities from entering the seal.

These and other objects and advantages of the invention will appear more clearly from the following specification in connection with the accompanying drawings, in which.

Figure 1:
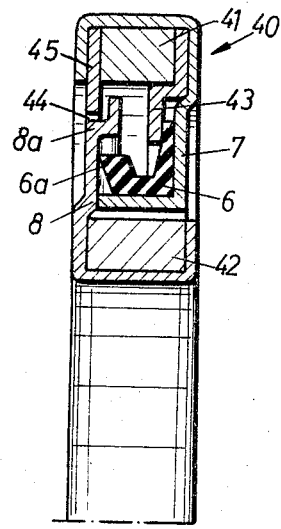
FIGURE 1 illustrates a section through one-half of a seal according to the present invention for use in connection with an anti-friction bearing.
Figure 4:
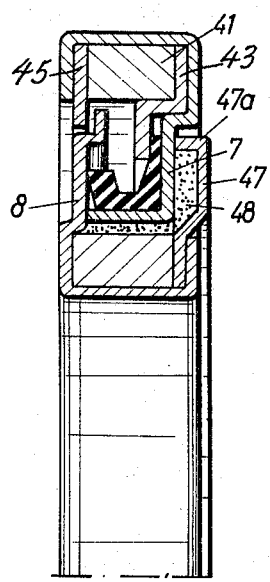
Figure 4A:
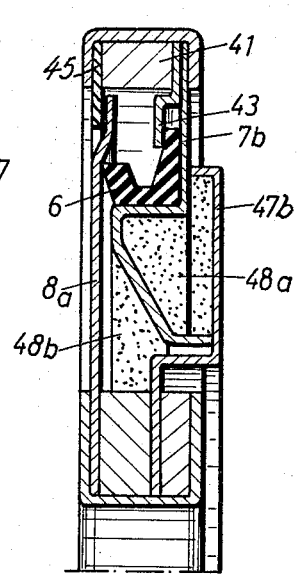
Figure 5:
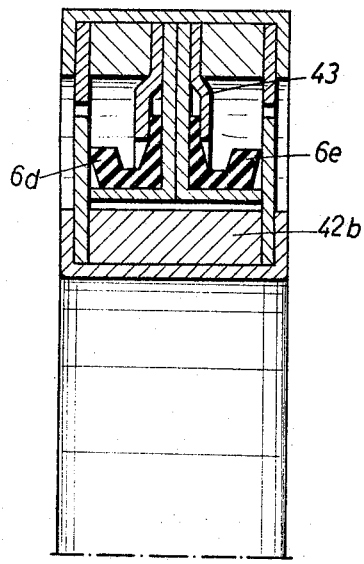
Figure 6:
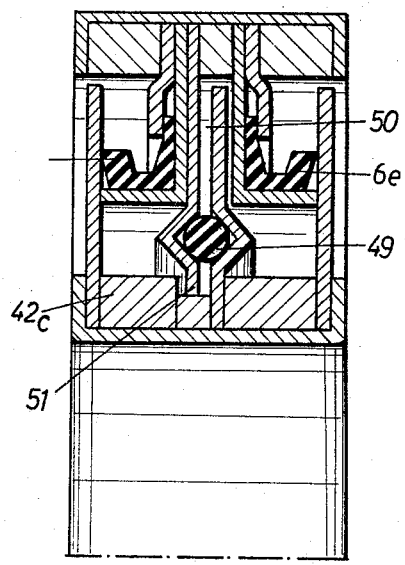
Figure 7:
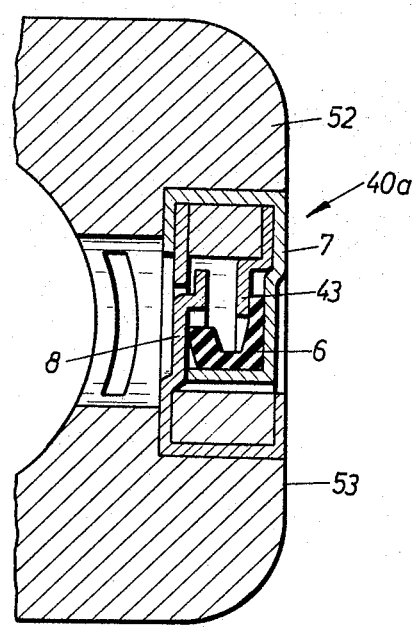

FIGURE 4 likewise represents a section similar to that of FIGURE 1 but shows an arrangement which is equipped with an additional sealing disc resting from the outside against the housing of the seal;

FIGURE 4a describes an arrangement which differs from that of FIGURE 1 primarily in that it contains two grease chambers in contrast to one grease chamber of the arrangement of FIGURE 4;

FIGURE 5 illustrates a section through one-half of a seal which is adapted to seal relative to two axially opposed sides;

FIGURE 6 shows an arrangement similar to that of FIGURE 5 but differing therefrom in that, in addition to the two elastic sealing rings employed in FIGURE 5, there is provided a further sealing ring in the form of an O-ring;

FIGURE 7 illustrates a seal arrangement according to the present invention inserted between the outer and inner race rings of an anti-friction bearing.

The seal according to the present invention which is intended for anti-friction bearings primarily comprises a housing having an outer housing section and an inner housing section slidably engaging each other and confining with each other a chamber in which a sealing ring of elastic material, as for instance rubber, is provided in such a way that it rests on one of said housing sections and is in sliding sealing engagement with the other housing section, while means are provided in the housing sections to withstand forces acting thereupon in axial direction of the housing.

If, for lack of space, it will be possible to mount such housing adjacent the anti-friction bearing, it is also possible, by reducing the dimensions of the housing, to arrange the same between the outer and inner race rings of an anti-friction bearing.

Structural arrangement

Referring now to the drawings in detail and FIG. 1 thereof in particular, the anti-friction bearing seal illustrated therein comprises a housing generally designated 40 which is formed by a protective disc 7 and an inner disc 8. Inserted into these housing parts are pressure rings 41 and 42 which are coaxially arranged with regard to each other so that the housing can be firmly clamped in. Protective disc 7 simultaneously covers an elastic sealing ring 6 arranged within said housing 40. Sealing ring 6 may advantageously be designed in the form of an angle or of an "S." Ring 6 is held in its position by a further inner disc 43 acting as clamping disc. This clamping disc 43 prevents sealing ring 6 from rotating and also prevents oil from seeping behind sealing ring 6.

Sealing ring 6 is provided with a sealing tongue 6a extending at an angle with regard to the remaining portion of sealing ring 6 and under a certain pre-load engaging disc 8 which latter above said tongue 6a is provided with a rectangular bend 8a. This bend is intended, particularly at high speed bearing sections, to prevent the oil which shoots through gap 44 from hitting directly upon the sealing tongue 6a and thereby lifting the same off disc 8. As will be obvious from the drawing, bend 8a brings about that the oil, which enters through gap 44 and has a lubricating effect, will press perpendicularly upon the sealing tongue 6a and press the same still closer against disc 8. The arrangement of FIG. 1 furthermore comprises a disc 45 which is so designed that only a small annular gap 44 will exist between the disc 44 and bend 8a.

Figure 2:
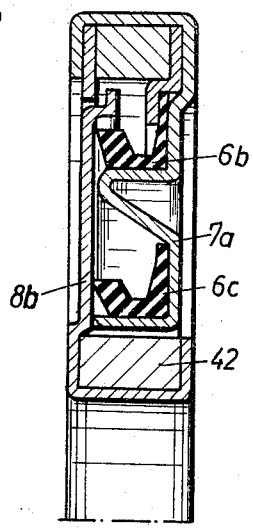
FIGURE 2 is a section similar to that of FIGURE 1 but differs therefrom in that instead of one sealing ring there are provided two sealing rings which are radially arranged one behind the other.
Figure 3:
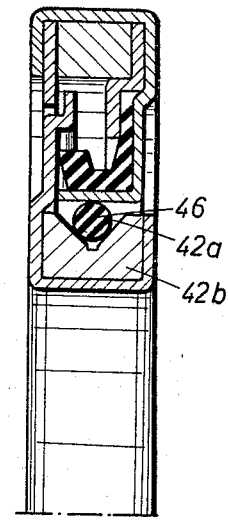
FIGURE 3 represents a section similar to that of FIGURE 1 but differing therefrom in that the arrangement of FIGURE 3 is equipped with an O-ring for preventing entry of heavy soilage.

Referring now to the modification illustrated in FIG. 2, this modification differs from that of FIG. 1 primarily in that two sealing rings 6b and 6c are provided which are radially arranged one behind the other, while the protective disc 7a is shaped accordingly. Also with this embodiment, the end face of disc 7a rests against the inner disc which in this instance is designated with the reference numeral 8b. With bearing portions which are exposed to a particularly heaving soilage, as is the case, for instance with machines used in the building industry, in mines, in agriculture, and the like, it is advantageous additionally to protect the seal against the entry of increased soilage. To this end, according to FIG. 3, an O-ring 46 is inserted in the housing, preferably under pre-load, and more specifically in a V-shaped groove 42a of the pressure ring 42b.

The embodiment illustrated in FIG. 4 likewise corresponds to a great extent to the arrangement of FIG. 1. However, the arrangement of FIG. 4 additionally comprises a sealing disc 47 which has an angled-off portion 47a resting against disc 7. The chamber 48 formed or confined by disc 47 and disc 7 forms a grease chamber for receiving sealing grease. Also in this instance, the housing of the seal is formed by the discs 7 and 8.

While with the embodiments described so far, disc 7 slidably engages the inner disc 8, according to the arrangement of FIG. 4a, disc 7b slidably rests on a sealing disc 47b. In this way, instead of the grease chamber 48, according to FIG. 4, there are formed two grease chambers 48a and 48b and two additional labyrinths which greatly improve the function of the anti-friction bearing seal. It is a matter of course that also with this seal, the protective disc 7b serves directly to hold the pressure ring 41 similar to FIG. 4.

FIG. 5 is a section through half of a sealing housing which is adapted to effect a seal toward the left as well as toward the right, for instance when it becomes necessary to effect a seal relative to two different liquid media. The two sealing rings 6d and 6e are in this instance located in axially adjacent arrangement while the inner pressure ring 42b has a corresponding width.

When the sealing element is subjected to a strong oil pressure or to heavy soilage, according to the arrangement shown in FIG. 6, a further sealing ring 49 may be provided between the two elastic sealing rings 6e and 6d. If it should occur that elastic ring 6e permitted oil and dirt to enter annular gap 50, this oil and dirt will be blocked by O-ring 49. In this connection, it will be appreciated that the said oil and dirt will press and deform O-ring 49 so that the inner edge portion of disc 51 is pressed against pressure ring 42c, and a further penetration of oil or dirt is prevented.

A housing of the type of housing 40 in FIG. 1 may also be produced on a smaller scale so that in conformity with FIG. 7 it can be inserted into the sealing chamber between the outer ring 52 and the inner ring 53 of an anti-friction bearing. This housing 40a shown in FIG. 7 has the same parts as FIG. 1 but only on a smaller scale and accordingly, the corresponding parts have been designated with the same reference numeral, but have been primed. Also with the arrangement of FIG. 7, the elastic sealing ring 6' is held by a protective disc 7' which at the same time forms the outer part of the housing. Inner disc 8' forms the other part of the housing. It is self-understood that also the housings according to FIGS. 2 to 6 may be made on a larger scale for insertion between the race rings of the respective anti-friction bearing.

It is, of course, to be understood that the present invention is, by no means limited to the particular embodiments described above and shown in the drawings, but also comprises any modifications within the scope of the appended claims. Thus, the individual chambers of the housings may be filled with grease or also with foam rubber inserts, or the like, in order further to improve the sealing effect of the seal according to the invention.

What I claim is:

1. A seal for anti-friction bearings, which includes: a radially inner annular channel-shaped member having a radially outwardly extending section, a radially outer annular channel-shaped member substantially coaxial with regard to said radially inner annular channel-shaped member and together therewith forming a housing, said outer annular channel-shaped member having an angled section extending in axial direction of said housing and having its free edge in sliding engagement with said radially extending section of said inner annular channel-shaped member, and elastic sealing ring means arranged between said outer and inner annular channel-shaped members in sliding engagement with said radially extending section of said radially inner annular channel-shaped member.

2. A seal for anti-friction bearings, which includes: a radially inner annular channel-shaped member, a radially outer annular channel-shaped member substantially coaxial with regard to said radially inner annuar channel-shaped member and in radially spaced relationship thereto, annular axially outer sealing disc means having its inner peripheral portion arranged in said inner annular channel-shaped member and having its outer portion forming an axially outward protrusion with the outer marginal portion thereof axially bent inwardly, angled off protective disc means having its outer peripheral portion arranged in said outer annular channel-shaped member and having its inner marginal portion arranged in said axial outward protrusion of said sealing disc means, said axially inwardly bent off section being in sliding engagement with said sealing disc means, and elastic sealing ring means interposed between a bent off portion of said sealing disc means and said outer annular channel-shaped portion.

3. A seal according to claim 2, in which said protective disc means and said sealing disc means confine chamber means with each other adapted to be filled with grease.

4. A seal for anti-friction bearings, which includes: a radially inner annular channel-shaped member, an outer annular channel-shaped member arranged in radially spaced relationship to said radially inner annular channel-shaped member and substantially coaxial therewith, said two channel-shaped members forming with each other portions of a housing for said seal, said radially outer annular channel-shaped member having a radially inwardly extending section with an axially inwardly extending protrusion respectively dividing said housing into an inner annular portion and an outer annular portion, first elastic sealing ring means arranged in said outer annular portion, second elastic sealing ring means arranged in said inner housing portion, said radially inner annular channel-shaped member having a radially outwardly extending portion for sliding engagement with the adjacent portion of said first and second elastic sealing ring means.

5. A seal for anti-friction bearings, which includes: a radially inner annular channel-shaped member, a radially outer channel-shaped member substantially coaxial with regard to said radially inner annular channel-shaped member and arranged in radially spaced relationship to said radially inner annular channel-shaped member, partition means of substantially L-shaped cross section and having a radial section and an axial section to thereby subdivide the annular space confined by said inner and outer channel-shaped members into two annular chambers arranged axially alongside each other, two sealing ring means respectively arranged in said chambers axially alongside each other, and holding means engaging a portion of said sealing ring means for holding the same in their respective positions with regard to said partition means.

6. A seal according to claim 5, which includes: first pressure ring means arranged within said inner annular channel-shaped member, second pressure ring means arranged within said outer annular channel-shaped member, holding means extending from said first pressure ring means to said second pressure ring means through said partition means, and O-ring means arranged between said holding means for cooperation with said first pressure ring means.

7. A seal for anti-friction bearings, which includes: a radially inner annular channel-shaped member, a radially outer annular channel-shaped member substantially coaxial with and in radially spaced relationship to said radially inner annular channel-shaped member, said outer annular channel-shaped member having a radially inwardly extending annular member mounted therein, said inner annular channel-shaped member having an annular radially outwardly directed extension being offset in axially outward direction with regard to said annular member in said outer channel-shaped member so as to confine with said last-mentioned member an annular gap, said outer annular member having a radially inwardly directed extension with an axially directed arm, and elastic sealing ring means arranged on said arm between the latter and said outer channel-shaped member and having at least a portion thereof in sliding sealing engagement with said radially outwardly directed extension of said inner annular channel-shaped member.

8. A seal for anti-friction bearings, which includes: a housing having an outer housing section and an inner housing section for respective insertion into the outer and inner race rings of an anti-friction bearing, said outer housing section having a radially outer annular channel portion of substantially U-shaped cross section and also including first disc means having a first portion extending radially inwardly from said outer annular channel portion and having a second portion extending from the inner end of said radially inwardly extending first portion in the axial direction of said outer annular channel portion, said inner housing section having a radially inner annular channel portion of substantially U-shaped cross section and also including second disc means extending radially outwardly from said radially inner channel portion and being slidably engaged by the free end edge of said second portion of said first disc means, an elastic sealing ring having a first portion held against said first disc means and also having a second portion in sliding sealing engagement with said second disc means, and annular substantially non-compressible means respectively filling in said radially inner and outer annular channel portions to prevent the side walls of each of said channel portions from being bent toward each other by axial forces acting thereupon.

9. A seal according to claim 8, in which said elastic sealing ring is of approximately U-shaped cross section with the leg adjacent said first disc means being longer than the leg which is in sliding sealing engagement with said second disc means.

10. A seal according to claim 8, in which said first disc means forms one single integral piece with said outer annular channel portion.

11. A seal according to claim 8, in which said substantially non-compressible means in said radially outer annular channel portion comprises a pressure ring and two auxiliary discs respectively arranged on opposite sides of said pressure ring, one of said auxiliary discs defining a narrow gap with the outer portion of said second disc means, and the other auxiliary disc clamping said sealing ring against said first portion of said first disc means.

12. A seal according to claim 8, which includes a further disc extending from said radially inner annular channel portion radially outwardly and having its end portion bent in axial direction of said housing and in sliding engagement with said first portion of said first disc means.

References Cited
UNITED STATES PATENTS

| | | | |
|---|---|---|---|
| 1,849,359 | 3/1932 | Braden | 277—39 |
| 2,240,252 | 4/1941 | Bernstein | 277—39 |
| 2,600,434 | 6/1952 | Saywell | 277—94 X |
| 2,639,954 | 5/1953 | Potter | 277—94 X |
| 2,750,215 | 6/1956 | Bermingham | 277—65 |
| 3,101,954 | 9/1963 | Huddle | 277—39 |
| 3,245,735 | 4/1966 | Sikora | 308—187.1 |

SAMUEL ROTHBERG, *Primary Examiner.*